United States Patent
Johannessen et al.

(10) Patent No.: US 8,578,702 B2
(45) Date of Patent: Nov. 12, 2013

(54) METHOD OF STORING AND DELIVERING AMMONIA AND THE USE OF ELECTROMAGNETIC RADIATION FOR DESORPTION OF AMMONIA FROM A CHEMICAL COMPLEX

(75) Inventors: Tue Johannessen, Glostrup (DK); Rasmus Zink Sørensen, Københaven Ø (DK); Claus Hviid Christensen, Lynge (DK); Ulrich Quaade, Bagsærd (DK); Jens Kehlet Nørskov, Holte (DK); Henning Schmidt, Allerød (DK)

(73) Assignee: Amminex Emissions Technology A/S, Soborg (DK)

( * ) Notice: Subject to any disclaimer, the term of this patent is extended or adjusted under 35 U.S.C. 154(b) by 563 days.

(21) Appl. No.: 12/279,233

(22) PCT Filed: Feb. 27, 2007

(86) PCT No.: PCT/DK2007/000092
§ 371 (c)(1),
(2), (4) Date: Apr. 9, 2009

(87) PCT Pub. No.: WO2007/095955
PCT Pub. Date: Aug. 30, 2007

(65) Prior Publication Data
US 2009/0313976 A1    Dec. 24, 2009

(30) Foreign Application Priority Data
Feb. 27, 2006  (DK) ................................ 2006 00273

(51) Int. Cl.
*F01N 3/10* (2006.01)
(52) U.S. Cl.
USPC .............................................. 60/286; 60/301
(58) Field of Classification Search
USPC .......................................... 60/286, 295, 301
See application file for complete search history.

(56) References Cited

U.S. PATENT DOCUMENTS

| 6,387,336 B2 | 5/2002 | Marko et al. |
| 2001/0042378 A1 | 11/2001 | Pfister et al. |
| 2002/0134074 A1* | 9/2002 | Huthwohl et al. .............. 60/286 |

FOREIGN PATENT DOCUMENTS

| DE | 103 23 591 | 12/2004 |
| EP | 1 647 324 | 4/2006 |
| WO | WO 2006/012903 | 2/2006 |
| WO | WO 2006/081824 | 8/2006 |

OTHER PUBLICATIONS

Molecular Absorption Spectra—NH3. University of Oklahoma Solid State Devices Group [online]. Oct. 24, 2004 [retrieved on Feb. 15, 2012]. Retrieved from the Internet:<URL:http://www.coe.ou.edu/sserg/web/Results/Spectrum/>.*
U.S. Appl. No. 11/815,146, filed Sep. 27, 2007, Johannessen et al.
U.S. Appl. No. 11/993,731, filed Dec. 21, 2007, Johannessen.
Search Report dated May 25, 2007 for Application No. PCT/DK2007/000092.
DE 103 23 591 Abstract.
EP 1 647 324 Abstract.

* cited by examiner

*Primary Examiner* — Thomas Denion
*Assistant Examiner* — Jonathan Matthias
(74) *Attorney, Agent, or Firm* — Frost Brown Todd LLC

(57) ABSTRACT

A method of storing and delivering ammonia and the use of electromagnetic radiation for desorption of ammonia from a chemical complex. Solid metal ammine complexes are applied for safe and high-density storage of ammonia to be released for use as reducing agent in selective catalytic reduction of $NO_x$ in exhaust gases. The compositional formula of the metal ammine complexes is $M(NH_3)_nX_z$, where $M^{2+}$ represents one or more metal ions capable of binding ammonia, X represents one or more anions, n is the coordination number (from 2 to 12), and z the valency of the metal ion (and thus the total number of compensating anion charges). Ammonia is released non-thermally by photon-activation using electromagnetic irradiation of the complex bond between ammonia coordinated to the metal ion.

16 Claims, 3 Drawing Sheets

METHOD OF STORING AND DELIVERING AMMONIA AND THE USE OF ELECTROMAGNETIC RADIATION FOR DESORPTION OF AMMONIA FROM A CHEMICAL COMPLEX

BACKGROUND OF THE INVENTION

1. Field of the Invention

This invention relates to the use of metal ammine complexes for storage of ammonia in solid form and for systems utilizing the solid storage material for delivery of ammonia by release of ammonia from the material using electromagnetic radiation. Upon release, ammonia may be used as the reducing agent in selective catalytic reduction (SCR) of $NO_x$ in exhaust gases from combustion processes.

Other applications using ammonia in mobile or portable units or in special chemical synthesis routes where storage of liquid ammonia is too hazardous are also considered embodiments of the present invention.

2. Description of the Related Art

Current environmental regulations necessitate the use of catalysts in the treatment of exhaust gas from automotive vehicles, boilers and furnaces for control of $NO_x$ emissions. Particularly, vehicles equipped with diesel or other lean burn (gasoline) engines offer the benefit of improved fuel economy, but catalytic reduction of $NO_x$ using conventional car exhaust catalysts (three-way catalyst) is not feasible because of the high oxygen content in the exhaust gas. Instead, selective catalytic reduction (SCR) has proven useful for achieving the required low levels of $NO_x$ in the exhaust gas both in stationary and mobile units. In such systems $NO_x$ is continuously removed from the exhaust gas by injection of a reductant into the exhaust gas prior to entering an SCR catalyst capable of achieving a high conversion of $NO_x$.

So far, the most efficient reductant has been ammonia, which is usually introduced into the exhaust gas by controlled injection either of gaseous ammonia, aqueous ammonia or indirectly as urea dissolved in water. In all cases, the amount of reductant being dosed has to be very precisely controlled. Injection of too high amount of reductant will cause a slip of ammonia in the exhaust gas whereas injection of a too small amount of reductant causes a less than optimal conversion of $NO_x$.

In many mobile units, the available technology is to use an aqueous solution of urea as the reductant since in this way potential hazards or safety issues relating to the transport of liquid ammonia are eliminated. However, there are several disadvantages related to the use of aqueous urea as the reductant. First of all, the use of urea solutions requires that a relatively large storage volume is available in order to enable transport sufficient amounts of ammonia. In typical systems, about 30 wt % urea solution is preferred meaning that about 70 wt % of a container holding the urea solution is used only to transport water. During operation the urea solution is sprayed into the exhaust gas, the droplets evaporate and the urea decomposes to ammonia (one molecule of urea forms two molecules of $NH_3$ and one $CO_2$) which by mass is roughly 50 wt % of ammonia in the urea molecule. Similar concentrations of ammonia can be achieved using aqueous solutions of ammonia as reductant. Furthermore, for technologies using aqueous solutions a specially designed spray nozzle combined with a precision liquid pump is required to ensure that a) the aqueous urea is delivered to the exhaust system at a desired (and dynamically changing) flow rate and b) that the solution is efficiently dispersed as fine droplets in the gas phase before entering the catalyst. Furthermore, the aqueous solutions might freeze in extreme weather conditions, or the urea solution may simply form precipitates, which might block the dosing system, e.g. the nozzle. Therefore, all lines have to be heated. Furthermore, the decomposition of urea may not proceed as wanted. There may be undesired side-reactions giving by-products in the form of solid deposits of polymers (melamine) and these side reactions also make it difficult to dose a very specific amount of ammonia since the amount of free ammonia released from a given amount of urea can vary according to the decomposition conditions.

Altogether, these difficulties may limit the possibilities of using SCR technology in pollution abatement, particularly in connection with mobile units. To circumvent these difficulties, the present invention devises an alternative method for transporting and dosing ammonia to exhaust gases prior to entering SCR catalyst systems.

As disclosed in applicant's copending application No. PCT/DK 2005/00516 metal ammine salts can be used as a solid storage media for ammonia which in turn may be used as the reductant in selective catalytic reduction to reduce $NO_x$ emissions from automotive vehicles, boilers and furnaces. Thus, the metal-ammine salt constitutes a solid storage medium for ammonia, which represent a safe and practical option for storage and transportation of ammonia. Usually, ammonia is released thermally from the preferred metal ammine salt by external heating, see e.g. European Patent No. EP 0 932 440 B1. The metal ammine salt is held in a container from which the released ammonia is dosed through a controllable valve directly into the exhaust gas in the desired proportion. Between the container and the valve, there may be a small buffer volume to increase the controllability of the system. Useful metal ammine salts have the general formula $M(NH_3)_n X_z$, where $M^{2+}$ is one or more metal ions capable of binding ammonia (For example M may be Li, Mg, Ca, Sr, V, Cr, Mn, Fe, Co, Ni, Cu, Zn, etc.), n is the coordination number (2-12), and X is one or more anions, where representative examples of X are F, Cl, Br, I, $SO_4$, $MoO_4$, $PO_4$ etc.

During release of ammonia, the original metal-ammine salt $M(NH_3)_n X_z$ is gradually transformed into $M(NH_3)_m X_z$ with m<n. When all the desired ammonia has been released, the resulting $M(NH_3)_m X_z$ can usually be converted back into $M(NH_3)_n X_z$ by an absorption treatment with an ammonia-containing gas stream.

Typical ammonia contents of the metal ammine complexes are in the range of 20-60 wt %, preferably above 30 wt %. As an example, a typical and inexpensive compound such as $Mg(NH_3)_6Cl_2$ contains 51.7 wt % ammonia. Using a compaction method such as the one disclosed in applicant's copending application No. PCT/DK 2006/00059 it is possible to obtain an ammonia density per unit volume above 90% of that of liquid ammonia.

Using applicant's technology enables storage of ammonia at significantly higher densities (both on a volume and a weight basis) than both aqueous ammonia and aqueous urea solutions. For several metal ammine salts it is possible to release all ammonia and then transform the resulting material back into the original metal ammine salt in a large number of cycles. This obviously constitutes preferred embodiments. Additionally, the ammonia is directly delivered in the form of a gas, which is an advantage in itself—both for the simplicity of the flow control system and for an efficient mixing of reducing agent, ammonia, with the exhaust gas—but it also eliminates potential difficulties related to blocking of the dosing system because of precipitation or impurities in a liquid-based system.

For mobile units, it is particularly useful to hold the metal ammine in a container that can be easily separated from mobile unit and replaced by a new metal ammine container. In preferred embodiments, the metal ammine containers are recycled and recharged with ammonia in a separate recharging unit or recharging facility.

Usually ammonia is released by normal heating generated by electrical resistance in heating elements or by using the heat from the exhaust gas. It is easy but poses several drawbacks: Since heat is supplied from an external source both ammonia depleted salt close to the heating element, the container itself as well as the saturated salt are also heated. Only the heating of the saturated salt results in additional release of ammonia and the heat absorbed in the container and the unsaturated salt is in principle wasted. Especially, under non-steady state operation this energy is lost during each start and stop cycle. Further, the response time of the system is limited since heat has to propagate by normal heat conduction from the heating element through unsaturated (depleted) salt to the saturated salt. This time response can be long making it more difficult to control the ammonia release and extending the duration of start-up. This is very important for emission control in the first 5-10 minutes after start up of an engine. Therefore, new methods and devices for efficient release of ammonia from the solid material in the container are attractive in this technical field.

SUMMARY OF THE INVENTION

The present invention relates to a method of storing and delivering ammonia, said method comprising the steps of:
(a) providing a container;
(b) placing an ammonia absorbing material in said container; and
(c) providing means for irradiating said ammonia absorbing material with electromagnetic radiation for photon-activated (non-thermal) release of ammonia to the gas phase.

In a second aspect the invention relates to a system for removing NOx from an oxygen-containing exhaust gas of a combustion engine or combustion process, the system comprising:
   a container with a solid ammonia storage material
   means for releasing ammonia from the solid to the gas phase by irradiating the material by electromagnetic radiation
   means for introducing gaseous ammonia from the container into an exhaust gas
   a catalyst for reducing NOx by reaction with the dosed ammonia
   means for controlling the amount of ammonia to give an optimal ration between NOx and ammonia in order to obtain high NOx conversion while minimizing ammonia slip from the gas down-steam from catalyst.

In a third aspect the invention relates to a device for providing ammonia for a selective catalytic reduction of NOx in an oxygen-containing exhaust gas of a combustion engine or combustion process by using gaseous ammonia and a reduction catalyst, the device comprising:
   a container for containing a solid ammonia storage material;
   means for irradiating said ammonia storage material with electromagnetic radiation for photon-activated (non-thermal) release of ammonia to the gas phase.
   means for introducing gaseous ammonia from the container into an exhaust line before a NOx reduction catalyst;
   means for controlling the amount of ammonia introduced into the exhaust line, depending on the operating conditions of the engine.

In a forth aspect the invention relates to the use of electromagnetic radiation for desorption of ammonia from a chemical complex in the form of a ionic salt.

The ammonia-containing material is a chemical complex in the form of an ionic salt of the general formula: $M_a(NH_3)_n X_z$, wherein M is one or more cations selected from alkali metals such as Li, Na, K or Cs, alkaline earth metals such as Mg, Ca, Sr or Al and transition metals such as V, Cr, Mn, Fe, Co, Ni, Cu or Zn or combinations thereof such as NaAl, KAl, K2Zn, CsCu or $K_2Fe$, X is one or more anions selected from fluoride, chloride, bromide, iodide, nitrate, thiocyanate, sulphate, molybdate and phosphate ions, a is the number of cations per salt molecule, z is the number of anions per salt molecule, and n is the coordination number of 2 to 12.

The wavelength of the radiation in the present method is between 1 and 15 micrometers. The wavelength spectrum of said radiation is chosen to match one or several absorption peaks of said ammonia containing material.

The ammonia containing material may be saturated with ammonia.

The ionic salt may be $MgCl_2$, $CaCl_2$, $SrCl_2$ or mixtures thereof.

The released ammonia may be used in selective catalytic reduction of NOx in exhaust gases from combustion processes.

The released ammonia may be used in NOx emission reduction from stationary and mobile combustion engines fuelled by diesel, petrol, natural gas or any other fossil fuels.

The released ammonia may be used in NOx emission reduction from stationary and mobile combustion engines fuelled by methanol, ethanol, hydrogen, methane, ethane or any other synthetic fuels.

The released ammonia may be used in NOx emission reduction from stationary and mobile power plants fuelled by coal, natural gas oil or any other fossil fuels.

The released ammonia may be used in NOx emission reduction from stationary and mobile power plants fuelled by methanol, ethanol, hydrogen, methane, ethane or any other synthetic fuels.

BRIEF DESCRIPTION OF THE DRAWINGS

The invention is disclosed more in detail with reference to the drawings in which.

DETAILED DESCRIPTION OF THE PRESENT INVENTION

Figure 1:
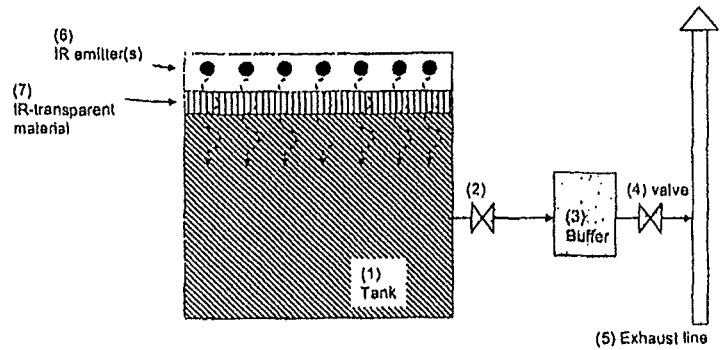
FIG. 1 shows an embodiment of a device of the invention.

In the present invention the activation of the ammonia molecules stored in the ammine complex is—as opposed to normal thermal desorption—carried out in the form of electromagnetic radiation. Chemical substances absorb electromagnetic radiation at specific wavelengths corresponding to transitions between different energy levels or bands in the molecule or chemical complex. In an absorption event, the energy is delivered from a photon in the electromagnetic radiation to a specific degree of freedom in the chemical substance resulting in a localized excitation far away from thermal equilibrium. Thus by choosing a proper frequency of the radiation, specific degrees of freedom can be excited selectively—for example the complex-bond between ammonia and the metal ion in the absorbing salt. In this way direct and non-thermal desorption can be realized. According to the invention it has been found that for several materials the wavelengths where the bonded ammonia results in absorption of radiation are outside the absorption region of the corresponding unsaturated material. This gives an ideal situation, where the unsaturated (depleted) salt is virtually transparent to the radiation and energy is supplied directly as photons at the reaction front of the saturated part of the salt without heating the unsaturated salt.

In one embodiment, the wavelength of the radiation is between 1 and 15 micrometers.

This provides several advantages over simple external heating: the activation energy is supplied exactly where needed without unnecessary heating of other parts of the system, thus improving efficiency. Thus, the response time of the system is significantly decreased. Furthermore, since the system is generally working at a lower temperature than a state of equilibrium between ammonia pressure and temperature of the material, the release of ammonia can be stopped nearly immediately in case of an accidental rupture of the container by turning off the radiation. This improves safety.

In a preferred embodiment, the ammonia storage/dosing system comprises the following elements: A storage material in a container is exposed (e.g. though a window of IR-transparent glass) to a flat panel of IR-emitters, which irradiates the entire storage volume from one side. The storage container holds a given amount of, initially, saturated metal ammine salt and the walls of the container are to a large extent polished surfaces in order to reflect any IR-radiation that is transmitted through depleted material. The flow of ammonia from the container is then passed to an optional buffer volume and then through a dosing valve, which accurately controls the amount of ammonia dosed into an ammonia-consuming process, e.g. DeNOx process in an exhaust system.

In another preferred embodiment, the IR-emitter is in the form of a rod-like shape, e.g. a cylinder, which is placed in a container surrounded by storage material.

In one embodiment, the ammonia-containing material is compacted to a dense block, rod, cylinder ring 10 or edged unit 11, such as a cube.

In yet another preferred embodiment, the entire mass of required storage material is subdivided into a number of—more or less—identical delivery modules in order to be able to avoid the need for irradiating through a very large amount of depleted material.

In a preferred embodiment, the storage material is a substance, which has a very low vapour pressure of ammonia at room temperature in order to make the handling of the material safe and to reduce the need for having thick walls of the storage container since the ammonia pressure in the container never will exceed e.g. 5 bars.

In yet another preferred embodiment, the material is $MgCl_2$, which in fully saturated form is $Mg(NH_3)_6Cl_2$.

In a preferred application the concept is applied an ammonia dosing device, where ammonia is release by IR-radiation and then dosed into an exhaust gas up-stream of a DeNOx-catalyst in order to reduce NOx emission by Selective Catalytic Reduction of NOx.

Other preferred applications are the use of the method for storing and providing ammonia to different kinds of applications consuming ammonia. These applications include chemical synthesis routes involving ammonia where storage of ammonia as liquid ammonia is not allowed for safety reasons.

Description of the Preferred Embodiments

The invention is now explained more in detail with reference to the drawings showing preferred embodiments of the invention.

Reference is made to FIG. 1 showing an embodiment of a device according to the invention having a tank (1) suitably made from an ammonia-resistant steel alloy or an ammonia-resistant polymer, which tank contains an initially ammonia-saturated material. A conduit carries the ammonia from the tank (1) through a valve (2) to a buffer tank (3) from which a conduit controlled by a valve (4) feeds the flow of ammonia into an exhaust line (5). At one surface of the tank (1) is a window or lid (7) made from a material transparent to IR radiation separating ammonia from a panel of IR emitters (6). When the material is irradiated with photons from the panel of IR emitters (6) through the transparent window or lid (7), ammonia is released from the material. The tank, buffer, valves and connecting tubes are made in a manner known per se and from materials resistant to ammonia.

Figure 2:
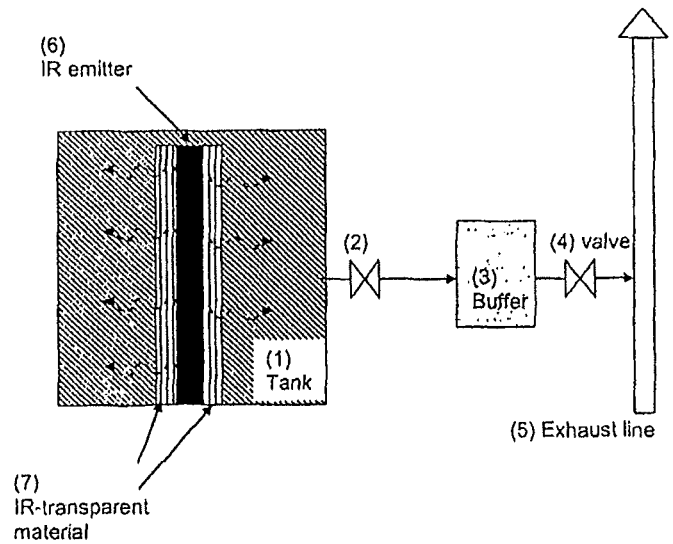
FIG. 2 shows another embodiment of a device according to the invention.

FIG. 2 shows another embodiment of a device according to the invention in which the tank (1) containing the initially ammonia-saturated material is irradiated with photons from a panel of IR emitters (6) placed inside the container e.g. as a cylinder and the photons are transmitted through a transparent glass or material (7) in order to separate the emitter from ammonia. A buffer (3) and valves (2,4) control the flow of ammonia from the storage container to the exhaust line (5) as in the embodiment of FIG. 1.

Figure 3:
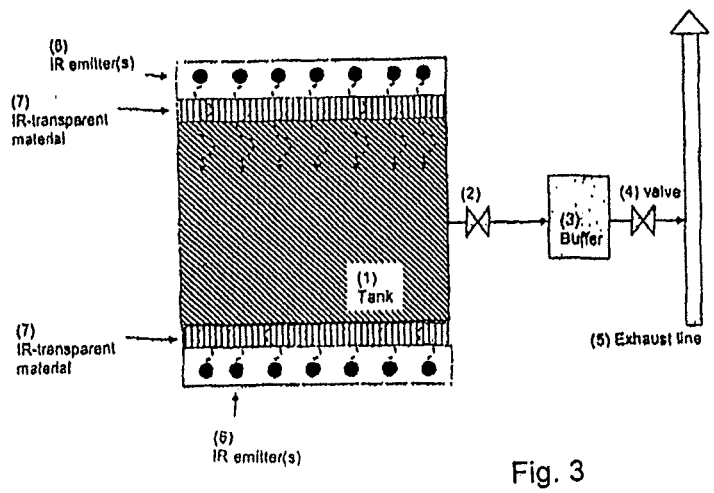
FIG. 3 shows yet another embodiment of a device according to the invention.
Figure 4:
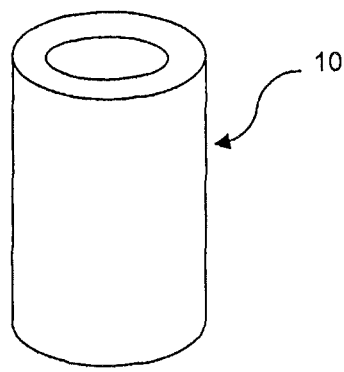
FIG. 4 shows ammonia containing material compacted to a cylinder ring.
Figure 5:
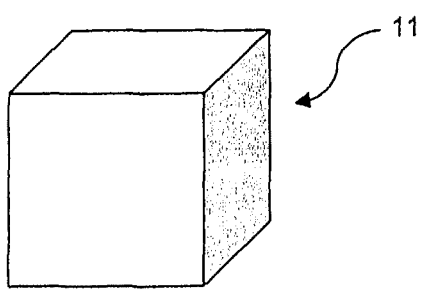
FIG. 5 shows ammonia containing material compacted to a cube.
Figure 6:
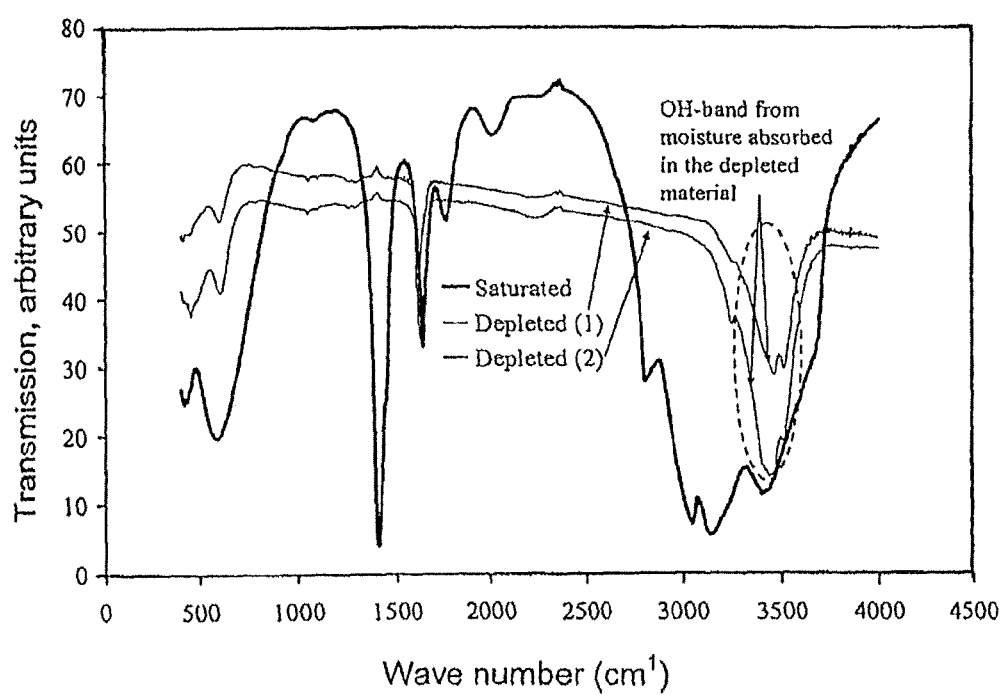
FIG. 6 shows the absorption spectra of ammonia saturated and ammonia depleted $MgCl_2$.

FIG. 3 shows absorption spectra of fresh (ammonia saturated) and depleted $MgCl_2$. The depleted samples are showing absorption peaks that correspond to —OH bands due to absorption of moisture in the dry $MgCl_2$ when the sample (a few milligrams) of depleted salt was taken from the used storage unit to the IR-apparatus. These absorption bands will not be present when the material is contained in a real unit as the depleted material will not be exposed to humid air The difference between the absorption of IR in the saturated and depleted material in the rage of 500-4000 $cm^{-1}$ is enormous. The dry depleted salt is close to being IR-transparent whereas the $NH_3$-containing material has significant photon absorption in the same range.

The invention claimed is:

1. A method of storing and delivering ammonia, said method comprising the steps of:
    (a) providing a container;
    (b) placing an ammonia containing material in said container, said ammonia containing material being a chemical complex in the form of an ionic salt of the general formula: $M_a(NH_3)_nX_z$, wherein M is one or more cations selected from alkali metals, alkaline earth metals, Al and transition metals or combinations thereof, X is one or more anions selected from fluoride, chloride, bromide, iodide, nitrate, thiocyanate, sulphate, molybdate and phosphate ions, a is the number of cations per salt molecule, z is the number of anions per salt molecule, and n is the coordination number of 2 to 12;
    (c) irradiating said ammonia containing material with electromagnetic radiation having a wavelength or wavelengths in the infrared region between 1 and 15 micrometers for photon-activated release of ammonia to the gas phase, wherein the wavelength spectrum of said radiation is chosen to match one or several absorption peaks of said ammonia containing material; and wherein the released ammonia is used in selective catalytic reduction of NOx in exhaust gases from combustion processes.

2. A method according to claim 1, wherein the ammonia containing material is saturated with ammonia.

3. A method according to claim 1, wherein the ionic salt is $MgCl_2$, $CaCl_2$, $SrCl_2$ or mixtures thereof.

4. A method according to claim 1, wherein the ammonia containing material is compacted to a dense block, rod, cylinder ring or a cube.

5. A method according to claim 1, wherein the radiation is emitted from one end of an elongated container.

6. A method according to claim 1, wherein the radiation is emitted from a cylindrical source inside the container surrounded by ammonia storage material.

7. A method according to claim 1, wherein the radiation is emitted from several surfaces of the container.

8. A method according to claim 1, wherein the release of ammonia is controlled by valves.

9. A method according to claim 1, wherein the released ammonia is used in NOx emission reduction from stationary or mobile combustion engines fuelled by fossil fuels.

10. The method of claim 9, wherein the fossil fuel is selected from diesel, petrol, and natural gas.

11. The method according to claim 1, wherein the released ammonia is used in NOx emission reduction from stationary or mobile combustion engines fuelled by synthetic fuels.

12. The method of claim 11, wherein the synthetic fuel is selected from methanol, ethanol, hydrogen, methane, or ethane.

13. The method according to claim 1, wherein the released ammonia is used in NOx emission reduction from stationary or mobile power plants fuelled by fossil fuels.

14. The method of claim 13, wherein the fossil fuel is selected from coal or natural gas oil.

15. The method according to claim 1, wherein the released ammonia is used in NOx emission reduction from stationary or mobile power plants fuelled by synthetic fuels.

16. The method of claim 15, wherein the synthetic fuel is selected from methanol, ethanol, hydrogen, methane or ethane.

* * * * *